Patented Feb. 28, 1933

1,899,542

UNITED STATES PATENT OFFICE

JAMES F. WALSH, OF EAST ORANGE, AND MANUEL R. XIMENEZ, OF SOUTH PLAINFIELD, NEW JERSEY, ASSIGNORS TO CELLULOID CORPORATION, A CORPORATION OF NEW JERSEY

MOLDING POWDER AND THE PROCESS OF MAKING SAME

No Drawing.   Application filed February 26, 1929.   Serial No. 342,716.

This invention relates to a process of making molding powder and includes the product resulting from the practice of the process.

There are various molding powders in use at the present time. However, as far as we are aware, many of these powders, such as compositions containing bonedust or other osseous substances, resins, or the various condensation products, have more or less of a tendency to shrink, warp or check under various conditions of use and are more or less affected by immersing in hot water. Furthermore, in many of these molding powders, trimmings or scrap, as well as defective material, cannot be reworked, and, being ordinarily not suited for other uses, results in considerable wastage. Some of these molding powders do not take die impressions in fine detail nor reproduce a high gloss. Some are not satisfactorily susceptible to finishing operations. Many cannot be formed into articles of lasting colors both plain and variegated. Many more are not thermo-plastic, but after being once formed into shape cannot be re-worked or re-shaped.

An object of our invention, therefore, is the production of a novel molding powder and a process of making same.

A further object of our invention is the production of a molding powder that is moldable into articles that will not shrink, warp or check, nor be seriously affected by immersion in hot water; that has characteristics that permit trimmings, scrap and defective articles to be repowdered and remolded, thus reducing waste; that will take die impressions in finest detail; that will reproduce a high gloss; that is susceptible to finishing operations with satisfactory results; that may be worked in lasting colors, both plain and variegated; and that is thermo-plastic.

A further object of our invention is the production of a molding powder containing cellulose nitrate, and wherein fire retardants are employed in order that the dry product may be ground without danger of explosion.

The formula, of course, is elastic to a considerable degree, and variations may of course be made. We prefer the following:

100 lbs. pyroxylin of about 10.80 to 11.40 percent nitrogen.
75 to 80 lbs. tricresyl phosphate or its equivalent.
300 to 350 lbs. of gypsum filler in fine powder.

Any desired amount of pigment and/or coloring matter for hue effects, and also a sufficient quantity of liquid solvent for combining the ingredients by mastication may be added. The use of pigments is obviously optional. In the event of their use the gypsum filler is preferably reduced a corresponding amount. All of the ingredients should be mixed thoroughly by the aid of the liquid solvent. Said solvent may be any appropriate menstruum or menstrua, for instance, ethyl alcohol, methyl alcohol, acetone, ethyl acetate, or ethyl-methyl ketone, alone or in combinations.

After conversion the mass is preferably worked down, for instance in calender rolls, that are preferably heated, until it is substantially dry or has a solvent content of from 2 to 5 percent. The composition becomes crumbly or flaky and is now further dried until practically all evidence of liquid solvent has disappeared. Then the material is ground or otherwise reduced to powdered form in a suitable mill or by other means. The powdering operation is accomplished without danger of fire or explosion inasmuch as the composition is non-inflammable. This particular feature is highly desirable. Heretofore nitro cellulose compositions could be ground only with great hazards. Grinding was generally accomplished under water. With our composition grinding may be accomplished without the aid of extraneous fire reducing agents.

The powdered product is now in condition for molding and may be utilized either in powdered form or may be formed into approximate shapes to facilitate handling.

Although tricresyl phosphate is specified for the formula any equivalent such as triphenyl phosphate or other aromatic phosphate, or dibutyl phthalate, dibutyl tartrate, paraethyltoluol-sulphonamid, triacetin, or other camphor substitute may be substituted therefor. A certain amount of celluloid scrap may be used should a low priced product be desired inasmuch as no particular damage results from the camphor or equivalent plasticizer in said scrap. However, the proportion of aromatic phosphate or other plasticizer should preferably be reduced in accordance with the proportion of camphor added.

The filler is preferably neutral calcium sulphate, inasmuch as the neutral variety tends to stability in the product.

Hydrated calcium sulphate is preferred inasmuch as the water of crystallization is conducive to non-inflammability.

Excellent molding powder is thus produced which molding powder has the qualities and characteristics enumerated. The superiority of applicants' composition will be readily appreciated by persons skilled in the art.

It is understood that the foregoing detailed description is given merely by way of illustration and that many variations may be made, within the scope of the claim, without departing from the spirit of the invention.

We claim:

A molding composition in powdered form containing in close combination approximately 100 parts of pyroxylin of about 10.80 to 11.40 percent nitrogen, 75 to 80 parts of aromatic phosphate, and 300 to 350 parts of gypsum.

In testimony whereof, we have hereunto subscribed our names.

JAMES F. WALSH.
MANUEL R. XIMENEZ.